(12) United States Patent
Yu et al.

(10) Patent No.: US 7,996,030 B2
(45) Date of Patent: Aug. 9, 2011

(54) SYSTEM AND METHOD FOR REDUCING CALL ESTABLISHMENT DELAY IN A WIRELESS NETWORK

(75) Inventors: Tai-Xing Yu, Tainan (TW); Ting-Kai Hung, Jhudong Township, Hsinchu County (TW); Hung-Chi Hsu, Hsinchu (TW); Shiao-Li Tsao, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 277 days.

(21) Appl. No.: 12/353,652

(22) Filed: Jan. 14, 2009

(65) Prior Publication Data

US 2009/0186620 A1 Jul. 23, 2009

Related U.S. Application Data

(62) Division of application No. 11/283,877, filed on Nov. 22, 2005, now Pat. No. 7,620,412.

(30) Foreign Application Priority Data

Jul. 25, 2005 (TW) .............................. 94125093 A

(51) Int. Cl.
*H04Q 7/20* (2006.01)
(52) U.S. Cl. ..................... 455/518; 455/517; 455/550.1; 455/574; 455/343.1; 455/343.4; 370/310; 370/311; 709/203; 709/212; 709/213; 709/228; 709/229

(58) Field of Classification Search .................. 455/518, 455/517, 550.1, 343.1–343.4, 422.1, 426.1, 455/427, 552.1, 458, 572–574, 500, 403, 455/466; 370/310, 311; 709/203, 212, 213–216, 709/228, 229, 230, 218, 219
See application file for complete search history.

(56) References Cited

U.S. PATENT DOCUMENTS

| 7,123,700 B1 * | 10/2006 | Weaver et al. ............. 379/88.19 |
| 2004/0013247 A1 * | 1/2004 | Kurokawa ................. 379/88.17 |
| 2005/0138451 A1 * | 6/2005 | Simpson et al. ............. 713/320 |

FOREIGN PATENT DOCUMENTS

EP 1 033 832 9/2000

* cited by examiner

*Primary Examiner* — Keith Ferguson
(74) *Attorney, Agent, or Firm* — Bacon & Thomas, PLLC

(57) ABSTRACT

A system and method for reducing call establishment delay in wireless network is provided, in which a network node establishes a call to a wireless terminal controlled by an AP via a server. The wireless terminal notifies the server of its listen interval. In the power saving mode, the wireless terminal wakes up every listen interval and listen the beacon to check whether any buffered packet for it. When the wireless terminal learns from the beacon that there are packets waiting, it communicates with the access point to retrieve them. The server records a listen time at which the wireless terminal will wake up and listen to the AP based on the listen interval. When a network node calls the wireless terminal, the server buffers the request for a time interval based on the listen time, and then sends the request to the wireless terminal.

16 Claims, 9 Drawing Sheets

☒ Wireless terminal wakeup
× Packet lost
| Packet buffered

SYSTEM AND METHOD FOR REDUCING CALL ESTABLISHMENT DELAY IN A WIRELESS NETWORK

BACKGROUND OF THE INVENTION

1. Field of the Invention

The invention relates to the technical field of wireless networks and, more particularly, to a system and method for reducing call establishment delay in a wireless network.

2. Description of Related Art

With extensive implementation of wireless networks (such as 802.11/WLAN, 802.16/WiMAX) in a public network or enterprise network, a wireless network environment can provide a packet voice service, voice over IP (VoIP), or multimedia service to a personal communication as a cheap and convenient choice. Most Internet communication systems use a session initiation protocol (SIP) or similar signaling protocol as a communication protocol standard to establish a connection. As shown in FIG. 1, the configuration of a wireless communication system uses an IP network or the Internet as the core network 10, and also uses an extension of wireless network access point/base stations (base stations) 11 to provide the wireless network access capability. One or more servers 12 are implemented in the core network 10 to assist in establishing a communication connection or session. The communication connection can be a voice over IP, video over IP, or other multimedia connection. With the help of the server 12, the Internet or IP node 13 can establish a connection communication service through the signaling protocol and the wireless terminal 15 in the wireless network.

However, the signaling protocol typically is based on a fixed network in design and does not consider the features of wireless network environments. As such, for a connection establishment, the signaling protocol typically supposes that the network is a wired network. When receiving a connection request from a caller in the wired network, the server 12 immediately forwards the call to the callee. In case of no immediate response, the server 12 further supposes that the wired network has a collision or the relative node is closed. In this case, the server 12 retransmit the call to the callee after starting a waiting mechanism for a span. Such a design of reducing network throughput and collision by prolonging the retransmission time is presented frequently in the signaling of the wired network. However, in a wireless network environment, a wireless node may not correctly receive partial downlink data due to power-saving design or temporary setup disconnection to the base station. Under the cited time-prolonging design, such a feature may cause the initial time prolonging on the call connection in the wireless network, and even with inappropriate parameters, no connection signaling protocol packet can be received by the wireless node.

To clearly illustrate the cited problem, the SIP, wireless local area network (WLAN) and VoIP service are given as an example to describe the signaling protocol design, wireless network and communication service. As shown in FIG. 2, a network node 13 uses a server 12 (SIP proxy) to establish a session with a wireless terminal 15 (SIP user agent or WLAN SIP UA) covered by a base station 11 in the wireless network. The server 12 starts a timer A (Timer A) to count time t1 (i.e., a duration from the time that the server 12 sends the request R1 to the time that the sever 12 receives a response sent by the wireless terminal 15) after sending a connection request R1 (SIP INVITE). If a response is not received in the time t1, the sever 12 re-sends the request R1 and starts the timer A to count a period of time 2×t1. In the SIP specification, it recommends to use exponential retransmission mechanism (i.e., t1, 2×t1, 4×t1, 8×t1, 16×t1, 32×t1, etc.) to reduce the network load, until another timer B (Timer B) reaches a predetermined time.

The SIP specification recommends setting the timer B to a period of time 64×t1 as the predetermined time. However, such a design can cause some problems in the wireless network environment. As shown in FIG. 2, to reduce the power consumption, the wireless terminal 15 may enter a power saving mode (PSM). In the power saving mode, the wireless terminal 15 can listen the beacon sent by the base station 11 every $t_{wakeup}$ interval, where the $t_{wakeup}$ interval is referred to as a listen interval. When it is found that a packet temporarily stored in the base station 11 is indicated by the beacon of the base station 11, the wireless terminal 15 switches to a normal operating mode in order to download data from the base station 11. In the design of WLAN, the wireless terminal 15 notifies the base station 11 of its sleeping time when determining to enter the power saving mode. Accordingly, the base station 11 starts to temporarily store all packets for the wireless terminal 15 without discarding a packet. However, with limited memory space, the base station 11 can provide limited storage space for each wireless terminal 15 to temporarily store the packets. In this case, if the sleeping time of the wireless terminal 15 exceeds the time provided to temporarily store the packets by the base station 11 and also the network significantly congests, a packet lost may occur. As shown in FIG. 2, it is assumed that the base station 11 can temporarily store the packets for $t_q$ interval and notify the wireless terminal 15 every $t_b$ interval of whether or not the packets are temporarily stored. Since the $t_{wakeup}$ interval is much greater than the $t_q$ interval, the SIP INVITE request (R1) may be discarded by the base station 11 after it is sent to the base station 11 for a span. Thus, the wireless terminal 15 cannot receive the request R1 and make the server 12 start a retransmission mechanism. In this case, a $t_{callest}$ interval is taken to complete a physical communication establishment, which heavily affects the time required for the communication establishment. In addition, upon the design of inappropriate parameters, the wireless terminal 15 may not receive any call message within 64×t1, thus the communication establishment will fail.

European patent EP1033832 issued to Lucent technologies INC. for a "Wireless data communication system having power saving function" has disclosed a TIM (Traffic Indicator Message) to carry an information to a wireless terminal in order to indicate that a message is temporarily stored in a base station or not. Further, according to the detail of the information, the wireless terminal can determine when to enter a power saving mode. Such a way can effectively overcome the problem of power consumption on the wireless terminal. However, it is suitable for an environment of implementing numerous wireless network access point/base stations due to the custom-designed information fields. Furthermore, such a way cannot effectively overcome the seriously prolonged call setup time caused by the prolonged sleeping time in view of saving the power. Therefore, it is desirable to provide an improved system and method to mitigate and/or obviate the aforementioned problems.

SUMMARY OF THE INVENTION

The object of the invention is to provide a system and method for reducing call establishment delay in a wireless network, which can effectively reduce the call establishment delay in the wireless network.

According to a first feature of the invention, a method for reducing call establishment delay in a wireless network is provided, which is used in a network node to call a wireless terminal covered by a wireless network access point/base station through a server. The server sends a connection request to the wireless terminal through buffering of the wireless network access point/base station to thus establish a connection. The method includes: a listen interval notifying step, which uses the wireless terminal to notify the server of a listen interval; a listen time determining step, which uses the server to obtain a listen time according to the listen interval, so that the server is aware of when the wireless terminal subsequently wakes up and listens to the wireless network access point/base station; and a connection request sending step, which uses the server to dynamically determine a time to send a connection request to the wireless terminal when the network node calls the wireless terminal. The invention also discloses a system to implement this method.

According to a second feature of the invention, a method for reducing call establishment delay in a wireless network is provided, which is used in a network node to call a wireless terminal covered by a wireless network access point/base station through a server. The method includes: a call establishing step, which uses the server to send a connection request to the wireless terminal through buffering of the wireless network access point/base station when the network node calls the wireless terminal to thus establish a connection, wherein the server is capable of locating the wireless terminal in a wireless network environment and a connection request sending step, which uses the server to dynamically determine a time to send a connection request to the wireless terminal when the wireless terminal in the wireless network environment is located by the server. The invention also discloses a system to implement this method.

According to a third feature of the invention, a method for reducing call establishment delay in a wireless network is provided, which is used in a network node to call a wireless terminal covered by a wireless network access point/base station through a server. The method includes: a wireless terminal inquiring step, which uses the wireless terminal to send an inquiry request to the server for inquiring retransmission information; a server responding step, which uses the server to send an inquiry response containing an inquiry result to the wireless terminal such that the wireless terminal determines a listen time according to the inquiry result for waking up to receive data; and a connection request sending step, which uses the server to dynamically determine a time to send a connection request to the wireless terminal. The invention also discloses a system to implement this method.

According to a fourth feature of the invention, a method for reducing call establishment delay in a wireless network is provided, which is used in a network node to call a wireless terminal covered by a wireless network access point/base station though a server. The method includes: a call establishing step, which uses the server to send a connection request to the wireless terminal through buffering of the wireless network access point/base station when the network node calls the wireless terminal, so as to thus establish a connection; a packet discarding and recording step, which uses the wireless network access point/base station to discard and record the packet when the wireless network access point/base station is not able to buffer a packet to be sent to the wireless terminal in a power-saving mode; and a wireless terminal listening and receiving step, which keeps the wireless terminal awake for a span in order to receive the packet when the wireless terminal wakes up from the power-saving mode and listens to the wireless network access point/base station to thus obtain a record associated with the packet discarded and recorded. The invention also discloses a system to implement this method.

According to a fifth feature of the invention, a method for reducing call establishment delay in a wireless network is provided, which is used in a network node to call a wireless terminal covered by a wireless network access point/base station through a server. The method includes: a packet buffering step, which uses the wireless network access point/base station capable of recognizing a packet used for call establishment to maintain the packet in buffering without discarding. The invention also discloses a system to implement this method.

Other objects, advantages, and novel features of the invention will become more apparent from the following detailed description when taken in conjunction with the accompanying drawings.

DETAILED DESCRIPTION OF THE PREFERRED EMBODIMENT

To illustrate the system and method for reducing call establishment delay in a wireless network in accordance with the present invention, the session initiation protocol (SIP), the wireless local area network (WLAN), and the voice over Internet protocol (VoIP) are given as an example to describe signaling protocol design, wireless network, and communication service. However, a similar VoIP signaling protocol such as H.323, another wireless network communication protocol such as WiMAX, and other communication services such as video over IP can be used. In addition, a server used in the invention indicates a network node with a server function, such as a typical SIP or H.323 server, or a node capable of servicing other nodes or devices in a peer-to-peer network.

Figure 1:
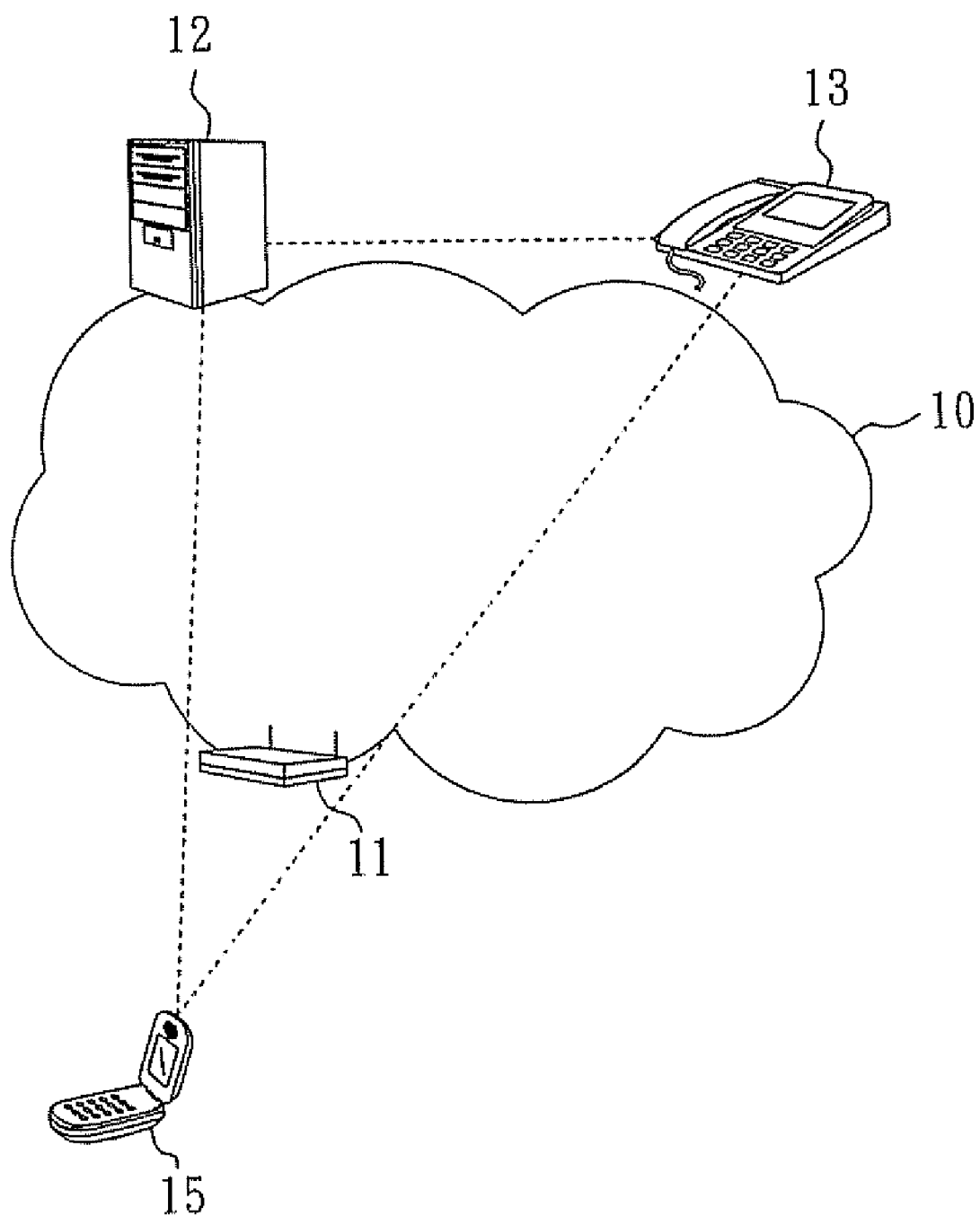
FIG. 1 is a configuration diagram of a typical wireless network communication system.
Figure 2:
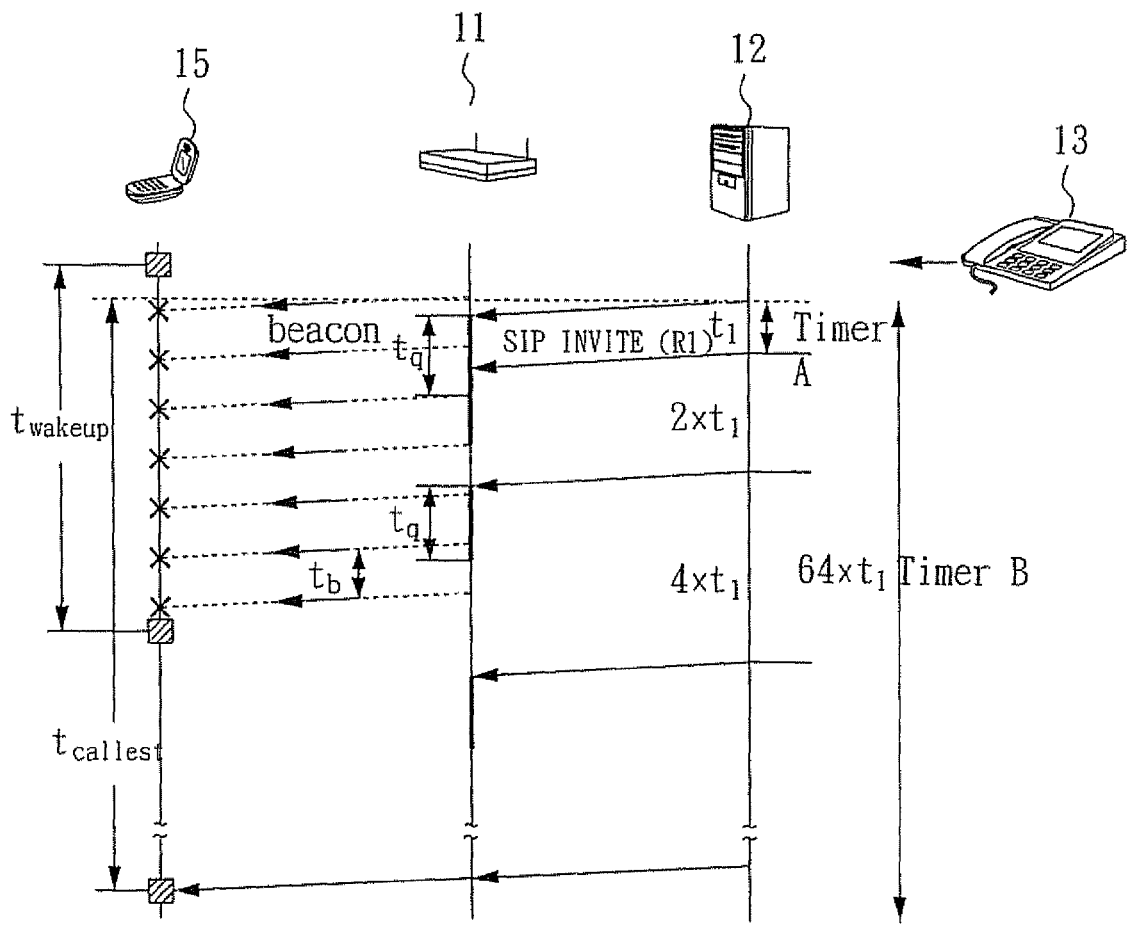
FIG. 2 is a flowchart of a typical connection establishment of wireless network phones using the session initiation protocol (SIP)
Figure 3:
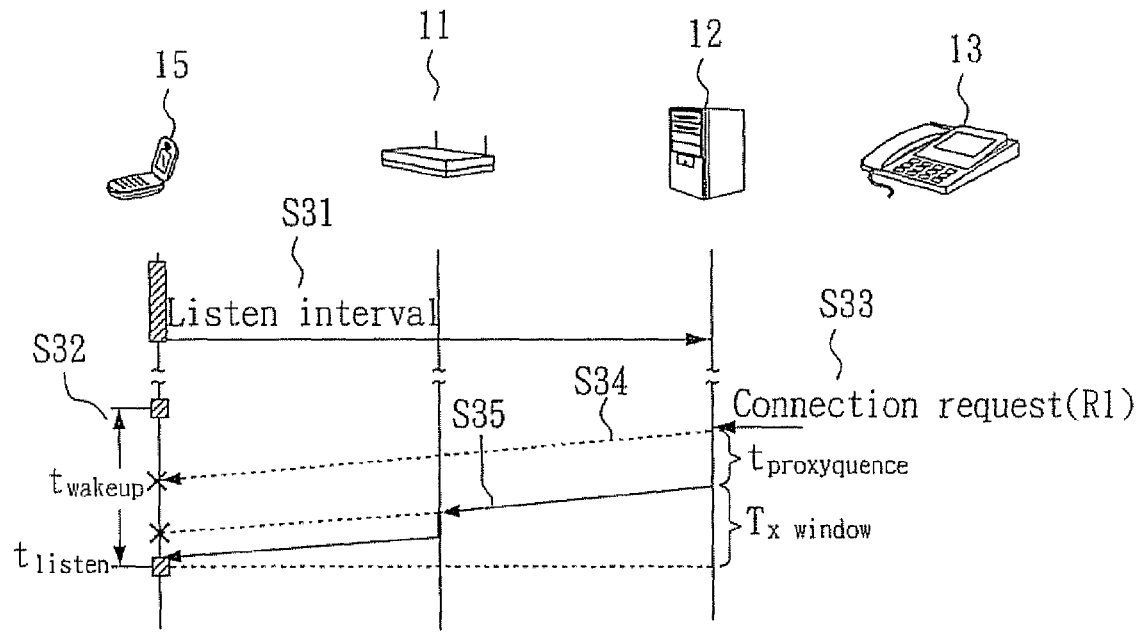
FIG. 3 is a flowchart of a system connection establishment according to a first embodiment of the invention.

FIG. 3 is a flowchart of a system connection establishment according to a first embodiment of the invention. As shown in FIG. 3, a network node 13 calls a wireless terminal 15 covered by a wireless network access point/base station 11 through a server 12. The server 12 receives a connection request R1 sent by the network node 13 and sends it to the wireless terminal 15 to thus establish a connection. The connection request R1 (SIP INVITE) is buffered by the wireless network access point/base station 11 before it is sent to the wireless terminal 15. In order to reduce the call establishment delay, the wireless terminal 15 in this embodiment requires first informing the server 12 of its listen interval $t_{wakeup}$. Accordingly, the server 12 can be aware of a listen time $t_{listen}$ for the wireless terminal 15 to listen to a beacon of the base station 11 (step S31). The wireless terminal 15 in the power-saving mode can wake up every listen interval for listening to the beacon sent by the base station 11 (step S32) and switches to a normal operating mode to receive a packet buffered by the base station 11.

When the network node 13 sends the connection request R1 for establishing the connection with the wireless terminal 15 (step S33), the server 12 forwards the connection request R1 to the wireless terminal 15 (step S34). If no response is received in a predetermined interval, the server 12 temporarily stores the connection request R1 for a span of $t_{proxyqueue}$ based on the listen time $t_{listen}$, which is next time for the wireless terminal 15 to listen to a beacon of the base station 11. When the listen time $t_{listen}$ is about running out, the request R1 is transferred to the wireless terminal 15 (step S35). In this embodiment, it is considered that certain network delivery time between the wireless terminal 15 and the base station 11 is required, and a span for the base station 11 to temporarily store a packet of the wireless terminal 15 is also required. Therefore, for a reasonable duration (Tx Window), the connection request R1 sent by the server 12 can be received by the wireless terminal 15. In this case, the server 12 only requires sending the SIP INVITE signal (R1) within Tx Window before the time $t_{listen}$, and the wireless terminal 15 can receive the request R1. Therefore, the listen time for the wireless terminal 15 to wake up and listen in can be computed appropriately through synchronization of the server 12 and the wireless terminal 15, so that unnecessary connection requests can be significantly reduced to thus avoid connection delay from connection request retransmission.

Figure 4:
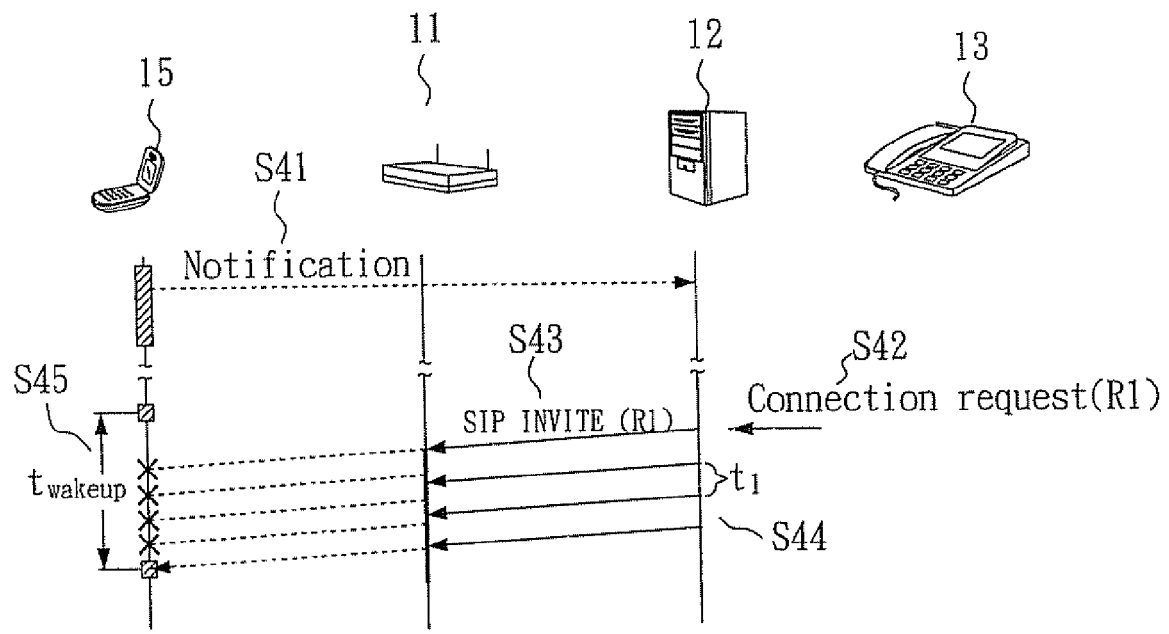
FIG. 4 is a flowchart of a system connection establishment according to a second embodiment of the invention.

FIG. 4 is a flowchart of a system connection establishment according to a second embodiment of the invention. As shown in FIG. 4, the network node 13 calls the wireless terminal 15 covered by a wireless network access point/base station 11 through the server 12. The server 12 receives a connection request R1 sent by the network node 13 and sends it to the wireless terminal 15 to thus establish a connection. The connection request R1 (SIP INVITE) is sent to the wireless terminal 15 through buffering of the wireless network access point/base station 11 in order to establish the connection. In order to reduce the call establishment delay, the server 12 in this embodiment must aware that the wireless terminal 15 is located in a wireless network environment, and this can be achieved by assigning a dedicated name to the wireless terminal 15 or sending the message from the wireless terminal 15 to the server 12 (step S41) in order to close the exponential retransmission way used for calling the wireless terminal 15. Accordingly, when the network node 13 calls the wireless terminal 15 (step S42), the server 12 can transfer the connection request R1 to the wireless terminal 15. If no response is received in a predetermined interval, the server 12 periodically re-sends the connection request R1 to the wireless terminal 15 within the time t1 (step S44).

The wireless terminal 15 in the power-saving mode can wake up every listen interval $t_{wakeup}$ for listening to a beacon sent by the base station 11 (step S45) and switches to a normal operating mode to receive a packet buffered by the base station 11. The time t1 is smaller than listen interval $t_{wakeup}$, and this can assure that the wireless terminal 15 after waked up can receive the connection request without missing. Thus, the connection delay is improved. This embodiment can allow the server 12 to have different retransmission time in a wired network device and a wireless terminal to further improve the connection delay.

Figure 5:
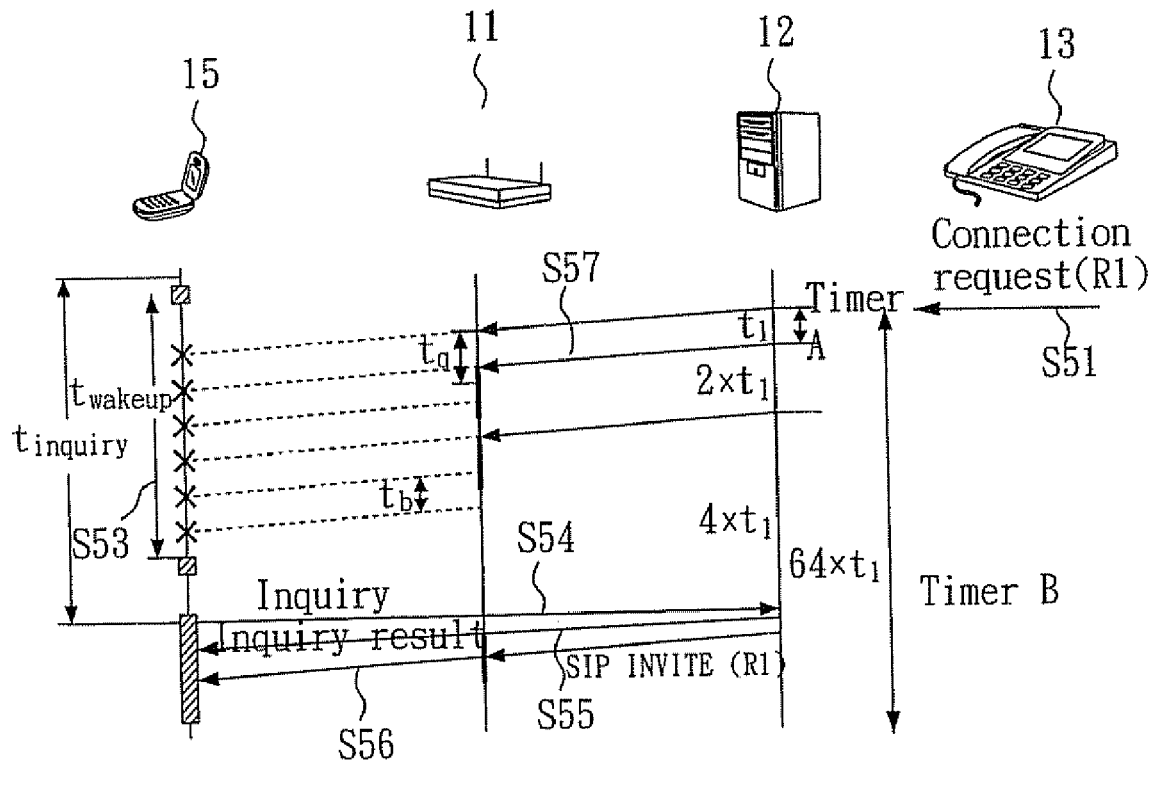
FIG. 5 is a flowchart of a system connection establishment according to a third embodiment of the invention.

FIG. 5 is a flowchart of a system connection establishment according to a third embodiment of the invention. As shown in FIG. 5, the network node 13 calls the wireless terminal 15 covered by a wireless network access point/base station 1 through the server 12. The server 12 receives a connection request R1 sent by the network node 13 and sends it to the wireless terminal 15 to thus establish a connection. The connection request R1 (SIP INVITE) is sent to the wireless terminal 15 through buffering of the wireless network access point/base station 11 in order to establish the connection. If the connection request R1 cannot be buffered by the base station 11, its corresponding packet is discarded.

When the network 13 sends the connection request R1 to establish the connection with the wireless terminal 15, the server 12 re-sends the connection request R1 using exponential retransmission mechanism (step S57) until the timer B (Timer B) times out.

The wireless terminal 15 in the power-saving mode can wake up every listen interval $t_{wakeup}$ for listening to a beacon sent by the base station 11 (step S53) and switches to a nominal operating mode to receive a packet buffered by the base station 11. In order to reduce the call establishment delay, the wireless terminal 15 in this embodiment sends an inquiry request in a predetermined time $t_{inquiry}$ (e.g., 64×t1) to the server 12 in order to inquire whether or not a connection request is waiting to be sent to the wireless terminal 15 (step S54). In addition, the wireless terminal 15 keeps awake in order to receive an inquiry response. After the inquiry request is received, the server 12 sends the inquiry response back to the wireless terminal 15 to notify an inquiry result (step S55). If the inquiry result shows that the connection request R1 to be sent to the wireless terminal 15 exists, the server 12 sends the connection request R1 to the wireless terminal 15 (step S56) to thus reduce the initial time delay.

Figure 6:
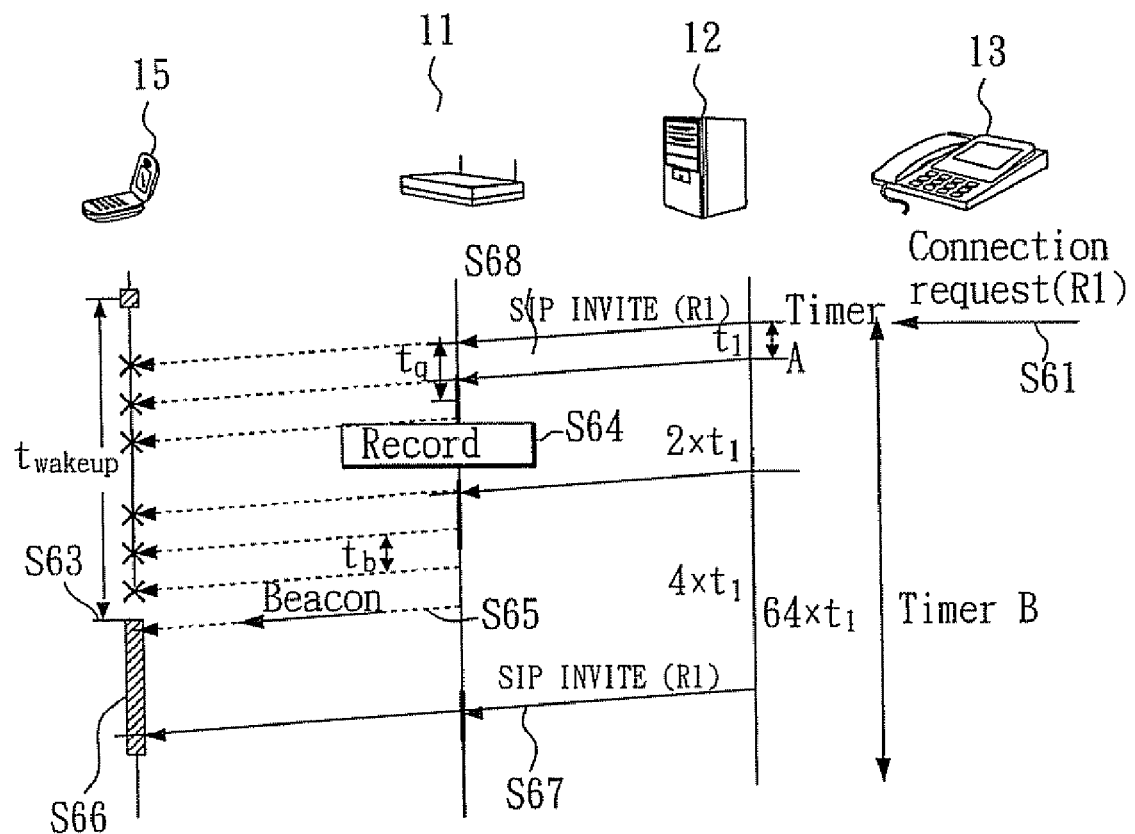
FIG. 6 is a flowchart of a system connection establishment according to a fourth embodiment of the invention.

FIG. 6 is a flowchart of a system connection establishment according to a fourth embodiment of the invention. As shown in FIG. 6, the network node 13 calls the wireless terminal 15 covered by a wireless network access point/base station 11 through the server 12. The server 12 receives a connection request R1 sent by the network node 13 and sends it to the wireless terminal 15 to thus establish a connection. The connection request R1 (SIP INVITE) is sent to the wireless terminal 15 through buffering of the wireless network access point/base station 11 in order to establish the connection. If the connection request R1 cannot be buffered by the base station 11, its corresponding packet is discarded.

When the network 13 sends the connection request R1 to establish the connection with the wireless terminal 15 (step S61), the server 12 re-sends the connection request R1 using exponential retransmission mechanism (step S68). The wireless terminal 15 in the power-saving mode can wake up every listen interval $t_{wakeup}$ (step S63) for listening to a beacon sent by the base station 11 (step S45) and switches to a normal operating mode to receive a packet buffered by the base station 11. In order to reduce the call establishment delay, this embodiment discards a packet to be sent to the wireless terminal 15 in sleeping when the base station 11 cannot buffer the packet, and keeps this in a record (step S64). As such, the wireless terminal 15 can be notified to receive the packet by a subsequent beacon (step S65). After being waked up and receiving this beacon, the wireless terminal 15 enters in the power saving mode for a span in order to receive its packet (step S66). Thus, a next connection request R1 sent by the server 12 can be received correctly (step S67). This embodiment can reduce the initial time delay through the base station 11 operated with the wireless terminal 15, without modifying the server 12.

Figure 7:
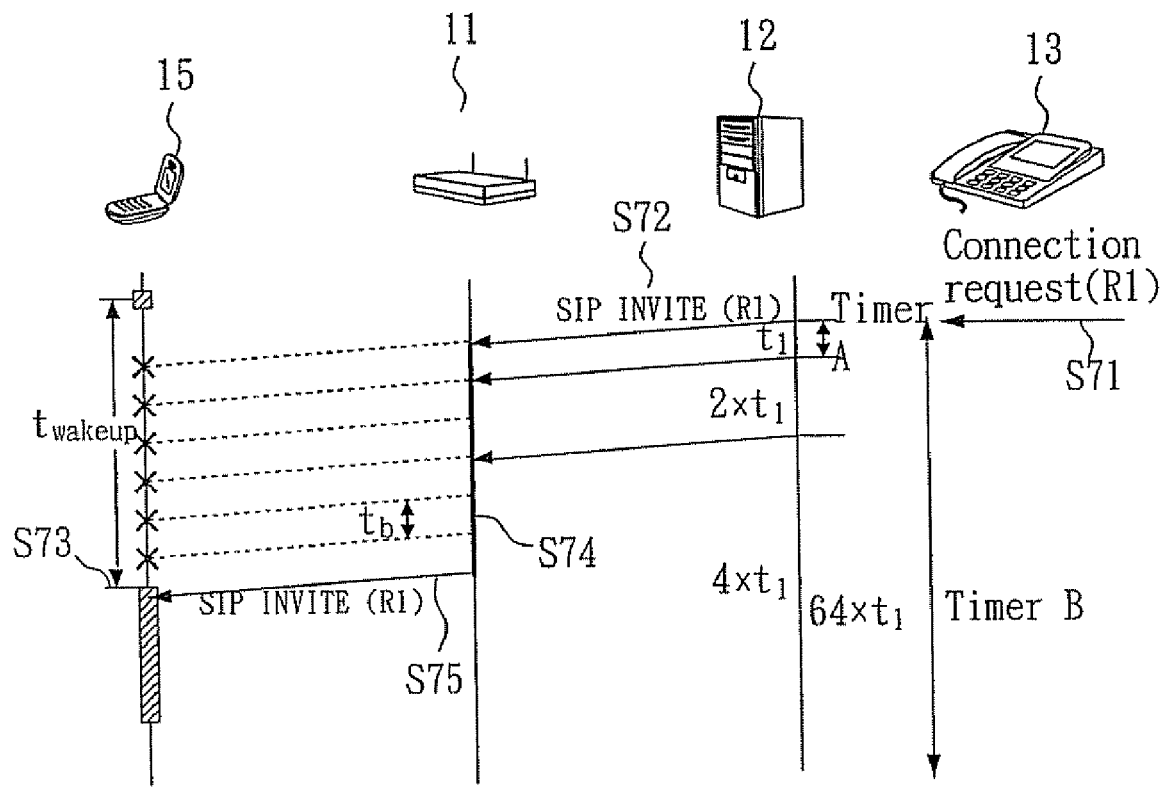
FIG. 7 is a flowchart of a system connection establishment according to a fifth embodiment of the invention.

FIG. 7 is a flowchart of a system connection establishment according to a fifth embodiment of the invention. As shown in FIG. 7, the network node 13 calls the wireless terminal 15 covered by a wireless network access point/base station 11 through the server 12. The server 12 receives a connection request R1 sent by the network node 13 and sends it to the wireless terminal 15 to thus establish a connection. The connection request R1 (SIP INVITE) is sent to the wireless terminal 15 through buffering of the wireless network access point/base station 11 in order to establish the connection.

When the network 13 sends the connection request R1 to establish the connection with the wireless terminal 15 (step S71), the server 12 re-sends the connection request R1 using exponential retransmission mechanism (step S72). The wireless terminal 15 in the power-saving mode can wake up every listen interval $t_{wakeup}$ for listening to a beacon sent by the base station 11 (step S73) and switches to a normal operating mode to receive a packet buffered by the base station 11. In order to reduce the call establishment delay, the base station 11 in this embodiment can identify the connection request R1 associated with the call establishment and buffer a packet corresponding to the connection request R1 for the wireless terminal 15 in the power saving mode, other than discarding the packet (step S74). Thus, the wireless terminal 15 after waked up can receive the connection request R1 buffered in the base station 11 (step S75), thereby reducing the delay of call establishment.

Figure 8A:
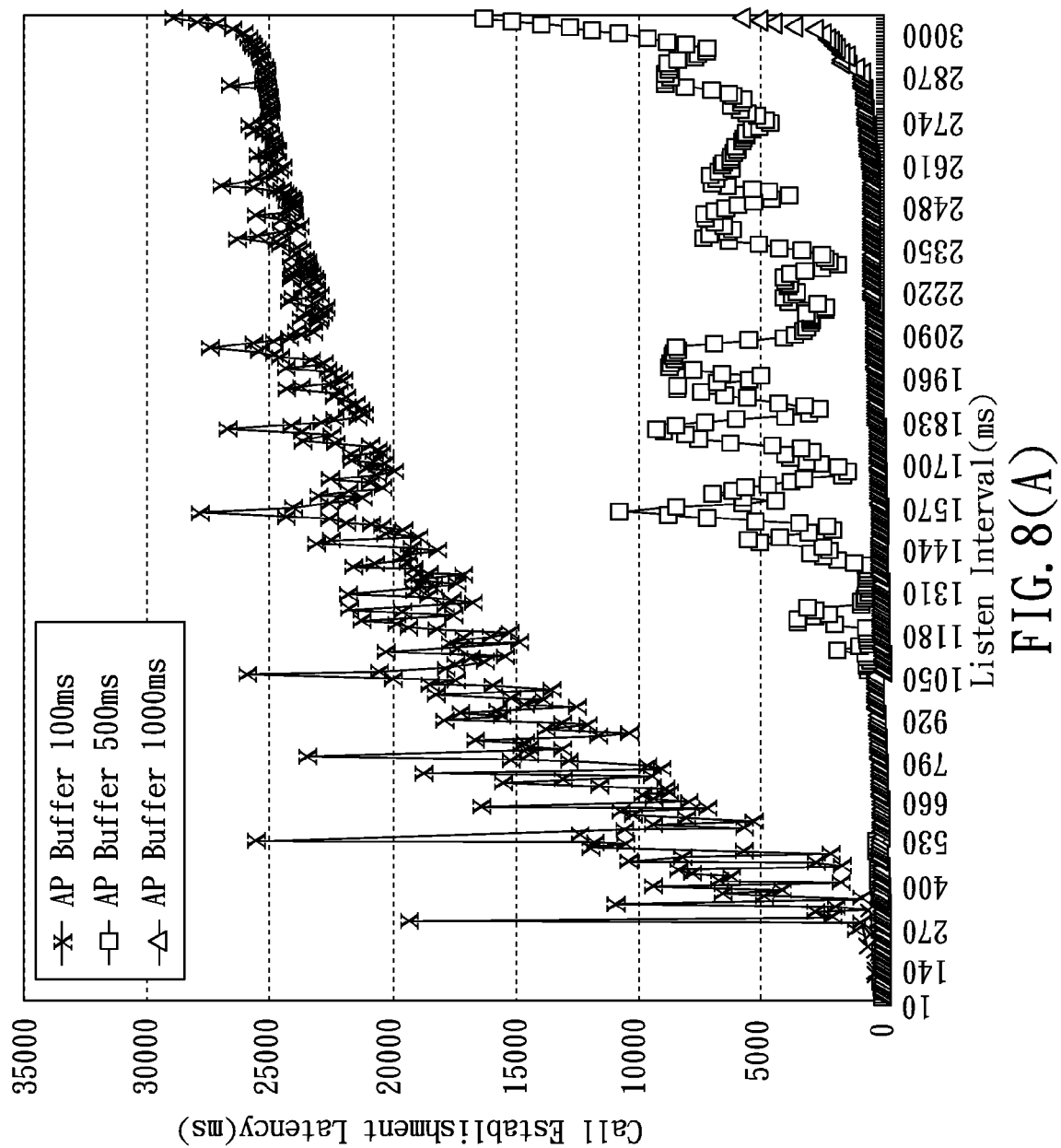
FIGS. 8(A) and (B) show graphs of required time respectively for a typical SIP calling and an invention calling.
Figure 8B:
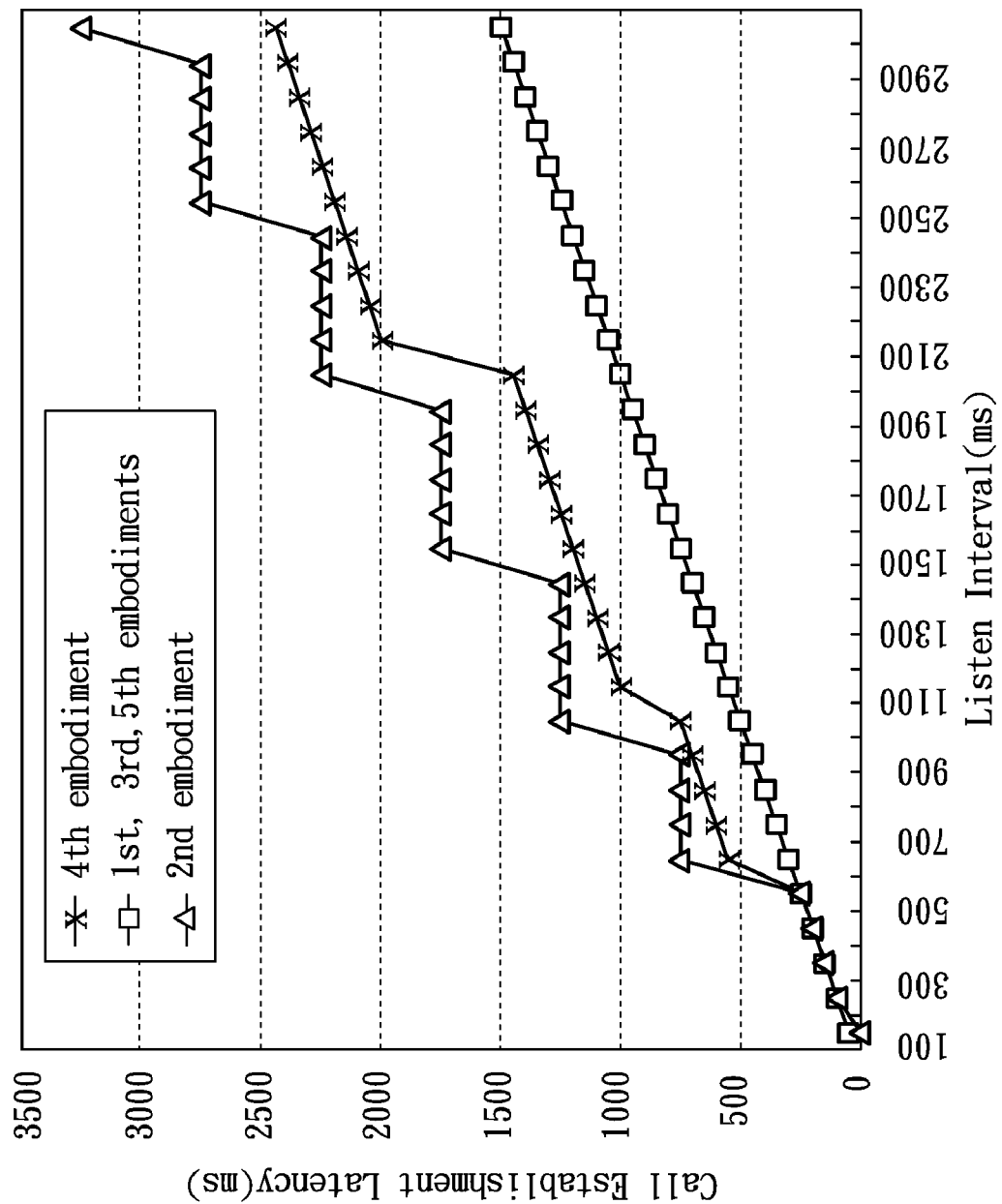

For verifying the performance, the operation of a typical SIP in a wireless network is analyzed. FIG. 8(A) illustrates the simulation results and the relationship between the listen interval and the call establishment latency under different AP buffer sizes, where the x-coordinate indicates the listen interval for the wireless terminal and the y-coordinate indicates the averaged call establishment latency. As shown in FIG. 8(A), it is found that the delay of communication establishment initiation (i.e., the averaged call establishment latency) can be as high as 15-25 seconds when the base station 11 can only buffer 100 ms packets for the wireless terminal. Such a communication establishment delay cannot be accepted by a real-time VoIP call, and even for 500 ms, it has the latency of 5 to 10 seconds. FIG. 8(B) shows an analysis graph resulting from the operations of the five embodiments according to the invention. As shown in FIG. 8(B), it is found that all embodiments can relatively reduce the call establishment time to 0.1 to 3 seconds. Such a call establishment time can be accepted by a typical VoIP.

Although the present invention has been explained in relation to its preferred embodiment, it is to be understood that many other possible modifications and variations can be made without departing from the spirit and scope of the invention as hereinafter claimed.

What is claimed is:

1. A method for reducing call establishment delay in a wireless network, which is used in a network node to call a wireless terminal covered by a wireless network access point/base station through a server, the method comprising:
   a call establishing step, which uses the server to send a connection request to the wireless terminal through buffering of the wireless network access point/base station when the network node calls the wireless terminal to thus establish a connection;
   a packet discarding and recording step, which, when the wireless network access point/base station is not able to buffer a packet to be sent to the wireless terminal in a power-saving mode, uses the wireless network access point/base station to discard and record the packet; and
   a wireless terminal listening and receiving step, which, when the wireless terminal wakes up from the power-saving mode and listens to the wireless network access point/base station to thus obtain a record associated with the packet discarded and recorded, keeps the wireless terminal awake for a span in order to receive the packet.

2. The method as claimed in claim 1, wherein the wireless network access point/base station in the packet discarding and recording step further uses a beacon to notify the wireless terminal in the power-saving mode of the packet discarded.

3. The method as claimed in claim 1, wherein the wireless terminal in the packet discarding and recording step determines the span of keeping in waking when the wireless terminal wakes up from the power-saving mode and listens to the wireless network access point/base station to thus obtain the record.

4. A system for reducing call establishment delay in a wireless network, comprising:
   a wireless terminal;
   a wireless network access point/base station, which covers the wireless terminal;
   at least one server; and
   a network node, which uses the server to send a connection request to the wireless terminal through buffering of the wireless network access point/base station to thus establish a connection;
   wherein the wireless network access point/base station discards and records a packet to be sent to the wireless terminal in a power-saving mode when the wireless network access point/base station is not able to buffer the packet, and when the wireless terminal wakes up from the power-saving mode and listens to the wireless network access point/base station to thus obtain a record associated with the packet discarded and recorded, the wireless terminal keeps awake for a span in order to receive the packet.

5. The system as claimed in claim 4, wherein the wireless network access point/base station further uses a beacon to notify the wireless terminal in the power-saving mode of the packet discarded.

6. The system as claimed in claim 4, wherein the wireless terminal determines the span of keeping awake when the wireless terminal wakes up from the power-saving mode and listens to the wireless network access point/base station to thus obtain the record.

7. The system as claimed in claim 4, wherein the server is a network node with a servo function, including a node in a peer-to-peer network.

8. A method for reducing call establishment delay in a wireless network, which is used in a network node to call a wireless terminal covered by a wireless network access point/base station through a server, the method comprising:
   a call establishing step, which uses the server to send a connection request to the wireless terminal through buffering of the wireless network access point/base station when the network node calls the wireless terminal to thus establish a connection;
   a packet discarding and recording step, which, when the wireless network access point/base station is not able to buffer a packet to be sent to the wireless terminal in a power-saving mode, uses the wireless network access point/base station to discard and record the packet;
   a wireless terminal listening and receiving step, which, when the wireless terminal wakes up from the power-saving mode and listens to the wireless network access point/base station to thus obtain a record associated with the packet discarded and recorded, keeps the wireless terminal awake for a span in order to receive the packet; and a packet buffering step, which uses the wireless network access point/base station capable of recognizing a packet used for call establishment to maintain the packet in buffering without discarding.

9. The method as claimed in claim 8, wherein the wireless network access point/base station in the packet buffering step first discards packets not used for call establishment when the wireless network access point/base station can not buffer more packet.

10. The method as claimed in claim 9, wherein the wireless network access point/base station in the packet buffering step determines a sequence of the packets to be discarded.

11. The method as claimed in claim 8, wherein the packet used for call establishment in the packet buffering step conforms to SIP and H.323 protocol.

12. A system for reducing call establishment delay in a wireless network, comprising:

a wireless terminal;

a wireless network access point/base station, which covers the wireless terminal and executes a packet discarding and recording process when the wireless network access point/base station is not able to buffer packets to be send to the wireless terminal in a power-saving mode;

at least one server; and a network node, which uses the server to send a connection request to the wireless terminal through buffering of the wireless network access point/base station to thus establish a connection;

wherein the wireless network access point/base station is capable of recognizing a packet used for call establishment in order to maintain the packet in buffering without discarding, and the wireless terminal in the packet discarding and recording process determines a span of keeping in waking when the wireless terminal wakes up from the power-saving mode and listens to the wireless network access point/base station to thus obtain a record associated with the packets discarded and recorded.

13. The system as claimed in claim 12, wherein the wireless network access point/base station first discards packets not used for call establishment when the wireless network access point/base station can not buffer packets.

14. The system as claimed in claim 13, wherein the wireless network access point/base station determines a sequence of the packets to be discarded.

15. The system as claimed in claim 12, wherein the packet used for call establishment conforms to SIP or H.323 protocol.

16. The system as claimed in claim 12, wherein the server is a network node with a servo function, including a node in a peer-to-peer network.

* * * * *